United States Patent [19]

da Silva Bento

[11] 4,126,518
[45] Nov. 21, 1978

[54] METHOD AND INCLINED CHAMBER FURNACE FOR CARBONIZING FLUENT CARBON-CONTAINING MATERIAL

[75] Inventor: Julio C. S. da Silva Bento, Linda-a-Velha, Portugal

[73] Assignee: Etablissement Capitrop, Vaduz, Liechtenstein

[21] Appl. No.: 822,318

[22] Filed: Aug. 5, 1977

[30] Foreign Application Priority Data

Aug. 20, 1976 [DE] Fed. Rep. of Germany ....... 2637564

[51] Int. Cl.² ............... C10B 11/00; C10B 49/06; C10B 57/10
[52] U.S. Cl. ............................ 201/27; 201/34; 202/93; 202/129
[58] Field of Search ............ 202/128, 129, 93–95; 201/34, 2.5, 25, 27

[56] References Cited

U.S. PATENT DOCUMENTS

| | | | |
|---|---|---|---|
| 847,399 | 3/1907 | Brown | 202/128 |
| 1,003,702 | 9/1911 | Carter | 202/128 |
| 1,092,950 | 4/1914 | Parsons | 202/128 |
| 1,423,527 | 7/1922 | Johns | 201/33 |
| 1,939,678 | 12/1933 | Evans | 202/129 |
| 3,112,255 | 11/1963 | Campion | 201/34 |
| 3,146,175 | 8/1964 | Mansfield | 201/34 |
| 3,148,108 | 9/1964 | Fagnant | 202/128 |
| 3,331,754 | 7/1967 | Mansfield | 201/34 |
| 3,434,932 | 3/1969 | Mansfield | 201/34 |
| 3,801,469 | 4/1974 | Essenhigh | 201/34 |

Primary Examiner—Morris O. Wolk
Assistant Examiner—Bradley Garris
Attorney, Agent, or Firm—Lane, Aitken & Ziems; Lane, Aitken, et al.

[57] ABSTRACT

A method of, and apparatus for, coking or carbonizing fluent or flowable carbon-containing material, such as wood, peat, residues, wastes or the like, by means of gases in an inclined treatment chamber through which the material moves from the top towards the bottom under the influence of gravity while utilizing the flow action of the material while exceeding the natural angle of repose of the material. Gas is conducted from the bottom towards the top in countercurrent flow to the material through the treatment chamber. The gases, constituting a mixture of an infed dosed supply of air and distillation gas escaping out of the material in gaseous state into the hot gas mixture, are exclusively conducted upwardly in the treatment chamber over the material in direct contact therewith owing to the natural rise or lift and the heat needed for coking or carbonizing the material is exclusively produced in the treatment chamber by combustion of the distillation gas with the infed air.

9 Claims, 3 Drawing Figures

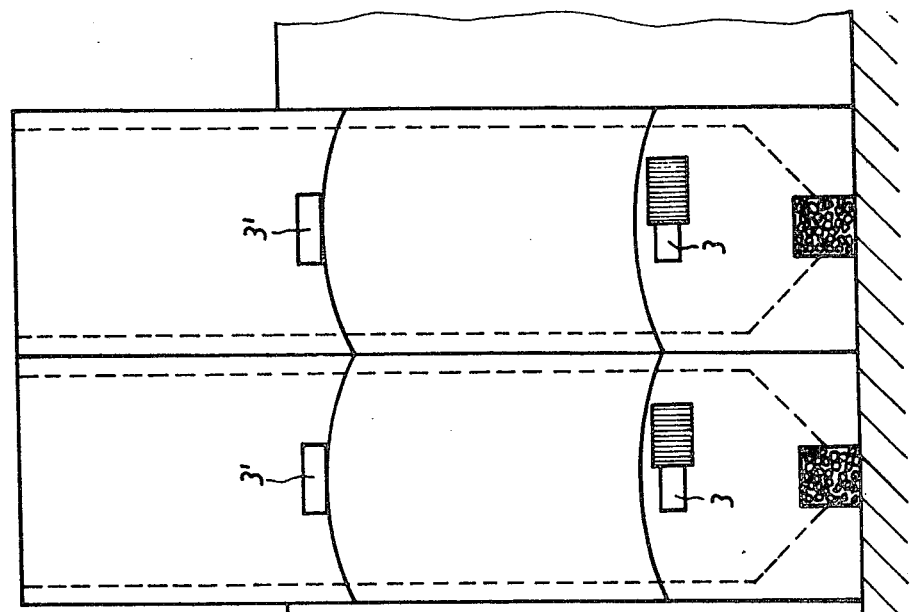
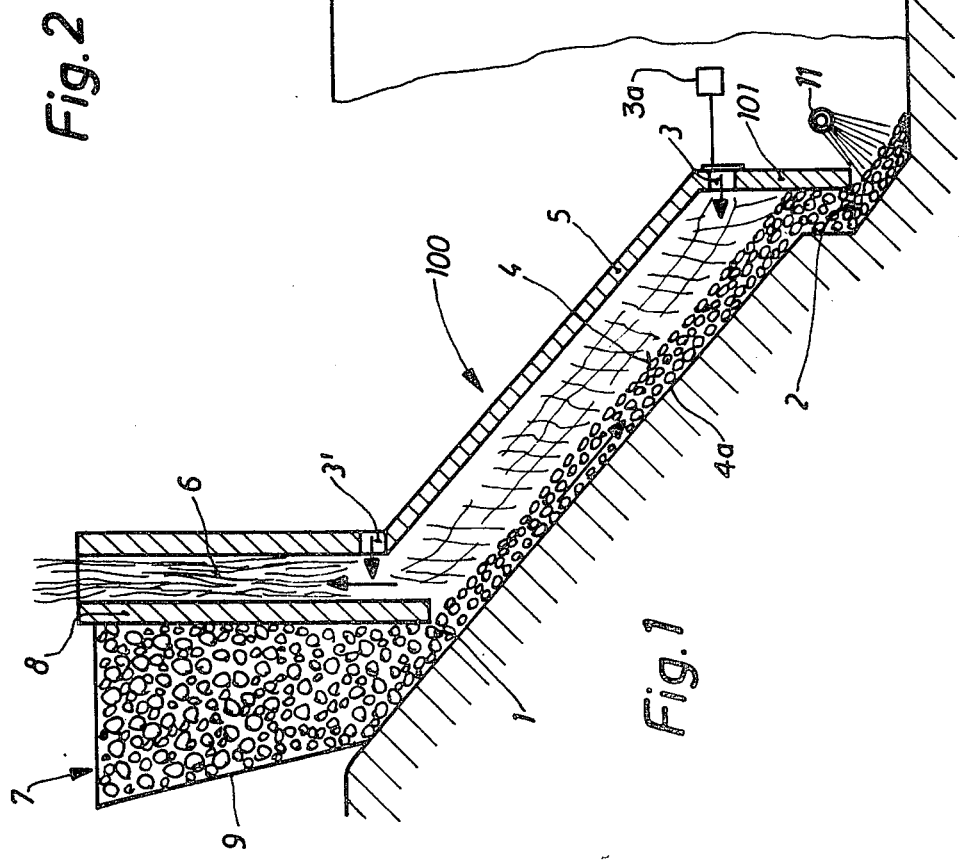

METHOD AND INCLINED CHAMBER FURNACE FOR CARBONIZING FLUENT CARBON-CONTAINING MATERIAL

BACKGROUND OF THE INVENTION

The present invention relates to a new and improved method of, and apparatus for, carbonizing or coking fluent carbon-containing material, such as wood, peat, residues, wastes or the like, with the aid of gases in an inclined treatment chamber through which there is moved the material due to the force of gravity from the top towards the bottom while utilizing the flow action of the material upon exceeding the natural angle of repose of the material, whereas gas is conducted from the bottom towards the top in countercurrent flow to the material through the treatment chamber.

From considerable time in the past wood charcoal has been fabricated by "coking" or "carbonizing" or pyrolysis, there occurring a thermal decomposition of the wood molecules under reduction conditions (deficiency in oxygen). Normally the heat needed for pyrolysis or for a combustion process is formed from the combustion of vapors or gaseous, volatile substances, which are formed during the distillation of the raw material. Primitive "furnaces" are formed by wooden heaps or piles which are covered by sand having holes for the inlet of air and the outlet of flue gases and volatile substances. Such furnaces or better stated kilns can only each be used for one charge.

There are also in use actual furnaces formed of metal or refractory stone or bricks, which are suitable for multiple use and operate cyclically. A cycle thus requires a number of days, sometimes weeks.

In order to avoid the numerous limitations with such furnaces which are to be operated in cycles, namely the very low yield, a large amount of manual labor (under very unfavorable working conditions), air polution and so forth, there have been developed continuous devices. The material which is to be carbonized is more or less continually delivered to the furnace and the fabricated charcoal or wood charcoal, after passing through the furnace, is likewise continuously removed. Such type devices are generally complicated, because they usually require mechanical systems for conveying the charge in the form of solids through the furnace under very unfavorable conditions (extremely high temperatures). In this regard attention is directed to U.S. Pat. No. 1,423,527. Consequently, such continuous furnaces are only economical if they are designed for extremely high capacity or high throughput. This leads to the result that a number of projects are only then not realizable because in certain areas there is not available sufficient raw material to be carbonized and adequate for such high capacity.

Prior art inclined chamber furnaces, such as disclosed in British Pat. No. 206,230, U.S. Pat. No. 1,003,702 and U.S. Pat. No. 1,423,527, work with indirect heating, and the combustion occurs in a separate combustion chamber through the walls of which there is heated the treatment chamber. In certain furnaces of this construction the treatment chamber possesses an inclination in the order of magnitude of the natural angle of repose of the material to be carbonized, for instance as taught in U.S. Pat. No. 1,003,702, so that there need not be employed mechanical conveyor means for the material in the treatment chamber. However, the indirect heating requires at least two separate chambers and is not very favorable as concerns the efficiency of the system.

There is also known to the art an inclined chamber furnace with a treatment chamber inclined at the natural angle of repose, wherein a mixture of compressed air and distillation gases is conducted above the material in unidirectional flow with the material and in direct contact with such from the top towards the bottom and then is fed back under the bed of material is countercurrent flow, in order to thus indirectly heat the material from below. In this regard attention is invited to U.S. Pat. No. 3,148,128. This furnace, in principle, possesses the same drawbacks as the just described furnace.

During coking or carbonization there are accomplished the primary method steps:
 (a) Drying: during such the water contained in the material charge is vaporized;
 (b) Degasification or volatilization: during this step, following drying and as a result of a corresponding temperature rise, the liquids contained in the wood are transformed into volatile gases;
 (c) Coking or carbonization: at higher temperatures the molecules of wood or residues, which normally contain carbon, hydrogen, oxygen and, when there are present proteins, also nitrogen, are split or decomposed, and there remain a content of carbon and inorganic constituents (carbon ash) as solids.

The speed of the method steps is dependent essentially upon the temperature according to which the process operates. Higher temperatures mean more rapid coking.

SUMMARY OF THE INVENTION

Hence, with the foregoing in mind, it is a primary object of the present invention to provide a method and apparatus of the previously described type which with simpler method operations and with a minimum of equipment expenditure renders possible economical operation also with a construction designed for smaller capacities and functioning in continuous or quasi-continuous operation.

Now in order to implement these and still further objects of the invention, which will become more readily apparent as the description proceeds, the method according to the present invention is manifested by the features that the gases which form a mixture of dosed infed air and distillation gases escaping in gaseous state out of the material in the heat produced by the gas mixture, are exclusively guided upwardly in the treatment chamber over the material in direct contact therewith owing to the natural rise or lift, and that the heat needed for coking the material is exclusively generated in the treatment chamber by combustion of the distillation gases with the infed air.

According to the invention, with an inclined chamber furnace for the performance of the method there is provided at the lower end of the treatment chamber an air inlet which is continuously open during operation, and the upper end of the treatment chamber merges into a chimney or flue having natural draft.

The main advantage of the inclined chamber furnace of the invention resides in the fact that it is not more complicated that the discontinuously operating, simple layer furnace and nonetheless works continuously at a high yield or efficiency. The raw material is carbonized or coked during its passage through the furnace, and volatile gases are continuously produced which are combusted and thus serve for generating the necessary thermal energy. The novel furnace does not require any mechanical devices for conveying the solid charged materials in order to remove the same, constituting the primary reason that the furnace is so inexpensive. Surprisingly the furnace nonetheless has a yield comparable to furnaces operating with mechanical devices and which are generally complicated in construction and require for their erection high investment costs. This means that even in regions or localities where there are not available such large quantities of raw materials, it is possible to economically carry out the production of charcoal or wood charcoal, for instance in third world countries.

Further important advantages of the furnace according to the present development, especially as concerns its operation in third world countries, so-called developing countries, resides in its robustness, operational reliability and its small maintenance demands.

According to a further constructional manifestation of the invention the inclined chamber furnace of the present invention is provided at the lower end of the flue or chimney with an additional completely open inlet for air. This inlet functions as an "afterburner" for the complete combustion of the not yet combusted volatile gases in the treatment chamber. In this way there is avoided air pollution by non-combusted volatile gases which produce extremely dark smoke. Furthermore, the draft is increased and the pre-heating effect, brought about by the withdrawn gases, is increased for the neighboring infed material.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a cross-sectional view through a furnace designed according to the present invention;

FIG. 2 is a view of two neighboring arranged furnaces of the type shown in FIG. 1.

DETAILED DESCRIPTION OF THE PREFERRED EMBODIMENTS

Figure 3:
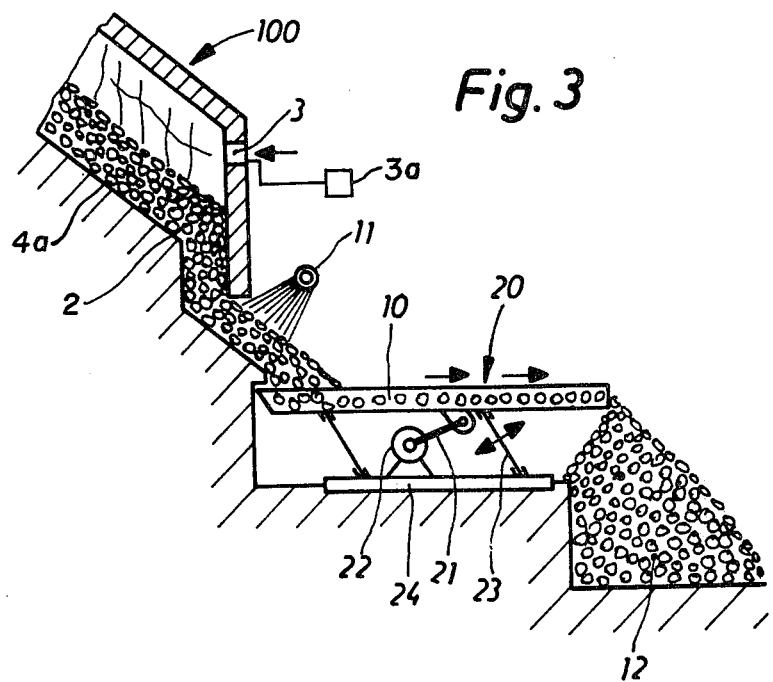
FIG. 3 is a modification at the outfeed end of the furnace according to the showing of FIGS. 1 and 2.

The furnace illustrated in FIGS. 1 to 3 will be seen to comprise an inclined furnace chamber 100. The inclination angle of the furnace chamber 100 with respect to the horizontal is in the order of magnitude of the natural angle of repose or inclination which the natural forming repose surface 4 of the material to be coked encloses with the horizontal. At the upper end the furnace chamber 100 has an inlet 1 and at the lower end an outlet 2. In the upper region of the lower boundary wall 101 of the furnace chamber 100 there is provided at a level above the repose surface 4 of the material to be treated a primary air inlet 3 through which the air can flow upwardly into the treatment chamber 100 between the repose surface 4 and the ceiling or roof 5 of the treatment chamber 100. The floor or fed 4a of the treatment chamber extends preferably linearly.

Apart from the inlet 1 communicating with the upper end of the furnace chamber 100 is a flue or chimney 6 for the flue gases and the volatile substances which are converted into a gaseous state and emanating from the material to be treated. The flue 6 is separated by a wall 8 from a filling hopper 7 arranged above the inlet 1.

Approximately above the upper end of the wall 8 the flue 6 is provided with a secondary air inlet 3'. The filling hopper 7 has a rear wall 9 whereas its front wall is formed by the wall 8 of the flue or exhaust 6.

A water spray nozzle 11 or equivalent structure serves for spraying the outflowing treated material such as the wood charcoal, the spray nozzle 11 being arranged externally of the furnace chamber 100 neighboring the outlet or exit portion 2.

With the embodiment of FIGS. 1 and 2 there are not provided any means for the removal or carrying away of the treated material. With appropriate dimensioning of the furnace or a number of furnaces arranged in a battery-like array according to the showing of FIG. 2, this material can be readily removed quasi-continuously by an operator with the aid of a simple tool such as a rake.

An alternative construction has been shown in FIG. 3. In that arrangement a mechanical shaker or jarring device 20, disposed below the outlet or exit 2 from the furnace chamber 100, serves for the outfeed of the treated material and for the deposition thereof into an intermediate storage bunker 12. The mechanical shaking device 20 possesses an oscillating platform 10 covered by a sheet metal plate, the oscillating platform 10 being hingedly connected by the links or guides 23 with a stationary base 24 and being driven by a motor 22 via an oscillating arm 21 to carry out oscillatory movements for the outfeed of the treated material, such as the wood charcoal.

A charging device, which can be provided for charging the filling hopper 7 with the material to be treated, has not been particularly illustrated. In the event such is provided it may be of conventional design.

With this apparatus it is possible to operate in the following manner.

By means of the inlet 1 the material, due to the action of gravity, arrives in the treatment chamber 100. The material can be in the form of residues, such as waste or refuse and can vary from coarse pieces to pulverulent material. In the furnace chamber 100, where the imaginary connection line or path between the upper edges of the inlet 1 and the outlet 2 encloses an angle of inclination with the horizontal which is greater than the natural repose angle or surface of constant slope of the fluent material, the material forms the natural repose surface 4. The furnace chamber functions with direct heating which is realized by virtue of the fact that a certain part of the gaseously escaping volatile substances out of the material moves directly into the space above the repose surface 4 and are combusted together with the air which arrives by means of the primary air inlet 3, so that the flames do not directly irradiate the surface of the material. Owing to the inclination of the furnace chamber at approximately the repose angle the material moves continuously in the direction of the outlet or exit 2. If it is removed in the treated condition at that location, then new material flows thereafter, so that a new state of equilibrium is established. With continuous movement of the material also new material continuously flows to replenish the removed material.

If the furnace is charged with waste wood, then there is obtained wood charcoal.

As will be apparent from the description and the drawings, a mixture of gases and vapors flows over the material in countercurrent flow with respect to the material movement in the furnace chamber 100, so that by means of the primary air inlet 3 air is automatically sucked-up into the flow channel formed between the natural repose surface 4 of the material and the furnace roof or ceiling 5. The sucked-up quantity of air can be regulated by varying the cross-sectional surface of the inlet 3. The air admixes with part of the volatile gases which escape due to the pronounced heating-up of the raw material, combust these gases and thus produces the heat needed for sustaining the method.

It is advantageous not to allow all of the gas which is developed to combust in the chamber 100 in order to prevent a rise in the temperature. This is achieved by regulating the air infeed at the inlet 3 as a function of the temperature measured in the chamber 100. For this purpose there is sufficient manual adjustment permitted in the altering of the inlet cross-sectional area, because the operation is extremely stable, so that very few regulation or control operations are sufficient. It is of course however possible to automate the furnace regulation or control in a conventional manner, such as by the regulation means 3a suitably connected to the inlet 3.

A mixture of inert gases, produced by combustion of the volatile gases, and hot non-combusted volatile gases flow to the flue or exhaust 6 in the upper portion of the furnace neighboring the filling hopper 7. In this way there is achieved a pre-drying or pre-heating of the raw material which subsequently arrives in the furnace chamber and is still located in the filling hopper 7.

The secondary air inlet 3' is provided for the case that the excess, non-combusted volatile gases should not be reclaimed for heating purposes or for the condensation of chemicals and should be blown-off into the air. As shown, the secondary air inlet 3' is located at the base of the flue or chimney 6, so that such serves as the "afterburner" for the complete combustion of the volatile gases which were not burned in the chamber 100. In this simple way there is completely avoided air pollution—non-combusted volatile gases which produce very dark smoke i.e. are extremely dirty—, the draft is increased and the pre-heating effect of the freshly infed material located in the filling hopper 7 is increased.

By virtue of the fact that not all of the volatile gases are combusted in the chamber 100, there is beneficially avoided rise of the temperature in the chamber 100 to too high values. Furthermore, there is produced a reducing atmosphere in the furnace. The thus prevailing deficiency in oxygen—which is not even enough for the complete combustion of all volatile substances—prevents the loss of the hot glowing charcoal (at high temperatures) near to the outlet or exit 2 due to partial combustion. The charcoal at the outlet 2 provides a seal against the ambient atmosphere, and it is cooled by the water spray means 11 externally of the furnace chamber neighboring the exit or outlet 2. After the cooling, with the dark charcoal there apparently does not exist any danger of burning or combustion externally of the furnace, where there is present an excess of air in contrast to the internal chamber of the furnace.

By virtue of this countercurrent flow of the material to be treated, produced in a natural manner without mechanical means, and the hot gases, for the production of which there are not required any complicated devices, the coking or pyrolysis furnace functions in an extremely simple and economical manner for the carbonization of every organic waste or residue.

The described furnace is susceptible to a regulation or variation of the degree of carbonization (a greater or smaller percentage of volatile substances remains in the carbonized material). It has been found that at a certain termperature and a certain raw material the content of the remaining volatile substances increases in the fabricated charcoal, if the throughput through the chamber 100 from the inlet 1 to the outlet 2 is accomplished in a shorter time span, and decreases when this throughput takes a longer period of time. The regulation is thus accomplished in that the charcoal emanating from the outlet is removed out of the water cooling region at a greater or smaller speed.

The described furnace must be continuously charged with residues, whereas the outfeed or removal of the carbonized material can occur continuously or intermittently, of course in short intervals. This renders possible the removal of the charcoal manually, for instance by means of a rake, with the aid of which the charcoal is removed out of the spraying zone or region in order to promote the downward flow or sliding of new charcoal out of the outlet.

The intermittent removal is especially advantageous with a battery arrangement of a number of the described furnaces in side-by-side relationship as shown in FIG. 2. A single operator can even manually empty a number of furnaces and control the cooling, in that he or she carries out the work which is to be accomplished in succession from furnace to furnace.

With the constructional embodiment of FIG. 3 the removal is mechanically accomplished, during such time as the mechanical shaker is turned on. In this case the finished product is continuously removed from the outlet and likewise is continuously conveyed to the charcoal intermediate bunker. From this location the material can be removed at a later period of time, for instance by means of a mechanical shovel or scoop and which can be the same shovel which is also used for charging the filling hopper 7.

The relationship between the width and the height of the chamber can be randomly selected, because the production is only a direct function of the total heating surface. Generally it is preferred, in consideration of the investment costs, to select the aforementioned relationship approximately according to the showing of FIGS. 1 and 2, there being provided a rather long and narrow roof or ceiling which can be more easily supported by means of refractory material. The dimensions need not necessarily be at right angles, although such is preferred in order to prevent dead spaces where the material cannot flow.

What is particularly important is to ensure that there always is present in the furnace a reducing atmosphere. The air which is needed for combusting part of the volatile substances, which is vaporized by the carbonization heat, is delivered by means of the adjustable primary air inlet 3, as mentioned above. Other possibilities for the inlet of air into the chamber 100 should be avoided. One such possibility can be constituted by the outlet or exit 2. However, this is usually continuously sealed by the small charcoal pile, which is already cool, and thus remains continuously sealed, so that other devices for sealing need not be provided under normal operating conditions.

A second possibility for the entry of the air into the furnace chamber could be formed by the inlet 1 for the raw material. This possibility is however not as unfavorable as the first mentioned possibility, because the air which enters in this case is directly sucked-up into the flue or chimney 6 and there deflected by the ascending gas stream. In each case the raw material located in the filling hopper itself has a sealing action at least then when the size of the pieces is small enough, something which is typical in actual practice.

The starting of the novel furnace- or pyrolysis chamber is likewise very simple. There are not required any special devices for the pre-heating of the furnace. What is necessary is only the charging of a small quantity of dried raw material which slides down to the outlet or exit 2. Due to the inclination there is present sufficient draft action in order to simply fire the material at the outlet or exit 2. This first material rapidly develops volatile gases, whereupon there is charged further raw material until the furnace is filled. After a short period of time the first material which has been carbonized in desired manner can be removed.

The operation furthermore can be terminated easily and practically. To this end there is only required termination of the charging and removing of the charcoal until the furnace is empty. Since there are not present any dead regions practically no material is combusted in the furnace.

The inclination of the furnace, which primarily serves the purpose of conveying the solid material through the furnace without any mechanical devices, has the additional advantage, for instance the advantage of intensifying the draft action upon the gas stream, so that there can be employed a shorter flue or chimney 6 and there is realized a saving in further mechanical devices, such as ventilators and the like.

Consequently, it is not only possible to maintain exceedingly small the fabrication costs, but it is possible for the furnace to be erected in each slightly or non-developed region, something which is not of minor significance, and there is only required a small quantity of water (0.5 m$^3$ per ton of charcoal) in order to ensure an intermittent manual operation which already renders possible extremely high production speeds.

Also the rectangular section of the flue or chimney 6, the width of which is equal to that of the furnace chamber 100, is not only easy to construct, rather additionally renders possible the use of an inexpensive filling hopper 7, and the rear wall 8 of the flue or chimney, which simultaneously forms the front wall of the filling hopper 7, serves for drying and pre-heating of the material to be carbonized which is located in the filling hopper. In the case of a battery arrangement of the described furnace the wall 8 can extend the total width of such battery arrangement.

In order to increase the capacity of the filling hopper 7 also the other light rear wall 9 of the filling hopper can extend over the entire width of the battery arrangement. For the operation of the furnace there is not required any specific training of the operator. The furnace can be mechanically charged.

In regions where manual labor is not too expensive, it is conceivable to manually charge the furnace. In such case it is possible to charge the furnace with rather large pieces of wood, and due to the high furnace temperatures (for instance 1000° C.) there can be accomplished a thermal decomposition of the large wooden pieces into smaller wood charcoal pieces which then depart out of the outlet 2 of the chamber 100.

A dry preparation of the carbon-containing materials of low quality such as peat, moor peat and even lignite is likewise possible with the described method and the described furnace.

Apart from many other fields of use, which essentially are applicable to the production of gas, whereby then the carbonized solid material is partially or completely consumed, there prevails a further use in the production of activated charcoal.

If wastes are employed from the agricultural industry, then the quality of the produced charcoal is very high with small content of ash, because the raw material does not contain any contaminants. On the other hand, if there is used domestic refuse, for instance after a certain homogenization and breaking-up thereof, then no drawback exists for the furnace even if the material contains a certain content of small metal parts which can be very easily removed following carbonization. In such instances, the quality of the charcoal is markedly dependent upon the composition of the residues, however usually still good enough for combustion as charcoal powder or as formed charcoal-like briquettes.

The surface upon which the material to be treated can downwardly flow under the action of the force of gravity could also be formed by a waste heap composed of the same material as the material to be treated.

While there are shown and described presently preferred embodiments of the invention, it is to be distinctly understood that the invention is not limited thereto, but may be otherwise variously embodied and practiced within the scope of the following claims.

Accordingly, what is claimed is:

1. A method for carbonizing flowable carbon-containing materials with the aid of combustion gases in an inclined treatment chamber through which the material is moved from the top towards the bottom by the force of gravity, said treatment chamber being in direct fluid communication with an exhaust flue, said method comprising the steps of:

flowing the carbon-containing material through the inclined chamber on an inclined, substanially thermally-nonconductive supporting surface;

controllably introducing air into the treatment chamber from a single inlet disposed at the bottom portion of the chamber;

generating the heat needed for carbonizing the material exclusively within the treatment chamber by combustion of the distillation gases from the material and the air introduced through said inlet;

continuously supplying air into the exhaust flue through a second inlet disposed at the lower portion of the flue, to induce burning within the flue of combustible material in the gases passing through the flue; and passing the heat-generating mixture of distillation gas and air exclusively through the treatment chamber, countercurrent to the flow of the material and in direct contact with the material, said countercurrent flow achieved by the natural lift of the burning mixture and the draft created by the additional burning of combustible materials in the flue.

2. The method as defined in claim 1, further including the step of preheating the carbon-containing material by passing the material in thermal contact with said exhaust flue before introducing the material into the treatment chamber.

3. An inclined chamber furnace for carbonizing flowable carbon-containing material, in which the heat required for the carbonizing process is produced totally and exclusively by combustion within the furnace of the distillation gases released by the carbon-containing materials, comprising:

a material treatment chamber having a material-supporting surface inclined at an angle greater than the natural angle of repose of the flowable material to induce a downward movement of said material on said surface, said surface having a very low thermal conductivity;

material feed means disposed at the upper end of said treatment chamber to provide the material to be treated to the upper end of said inclined surface;

outlet means provided at the lower end of said chamber for the removal of the treated material;

an air inlet having an adjustable cross-sectional area disposed at the lower end of said chamber, said inlet being continuously open during furnace operation;

an exhaust duct disposed at the upper end of said chamber and being in fluid communication with said chamber for the removal of gases, said duct being disposed in heat-exchange contact with said material feed means, such that the heat of gases leaving said chamber and duct preheats the material to be treated disposed within said feed means; and an additional, continuously-open air inlet provided at the lower end of said exhaust duct, the air supplied through said additional inlet contributing to the combustion within said exhaust duct of combustible matter in said gases, the flow of air through said additional inlet cooperating with the flow of air through said adjustable inlet and with the combustion in said exhaust duct to produce a strong draft upwardly through said duct and to induce a flow of combustion gases countercurrent to the downward flow of the material to be treated, the carbonizing process being achieved by direct contact of said combustion gases with the material on said surface.

4. The inclined chamber furnace as defined in claim 3, wherein said air inlet includes means for manually adjusting the cross-sectional area.

5. The inclined chamber furnace as defined in claim 3, wherein said air inlet includes regulating means for adjusting the cross-sectional area.

6. The inclined chamber furnace as defined in claim 3, further including spray means arranged at the outlet means of the treatment chamber to cool the treated material leaving said chamber.

7. The inclined chamber furnace as defined in claim 3, further including mechanical shaking means provided at the outlet means of the treatment chamber for the removal of the treated material into an intermediate storage bunker.

8. The inclined chamber furnace as defined in claim 3, further including a plurality of said treatment chambers arranged next to one another in a battery arrangement.

9. The inclined chamber furnace as defined in claim 3, wherein the outlet means of the treatment chamber is sealed to prevent the entry of air into the chamber from said outlet means.

* * * * *